United States Patent
Wu et al.

(10) Patent No.: US 11,426,792 B2
(45) Date of Patent: Aug. 30, 2022

(54) METHOD FOR MANUFACTURING OBJECTS USING POWDER PRODUCTS

(71) Applicant: General Electric Company, Schenectady, NY (US)

(72) Inventors: Zhiwei Wu, Shanghai (CN); Yanmin Li, Shanghai (CN); David Henry Abbott, Mason, OH (US); Xiaobin Chen, Shanghai (CN); Thomas Froats Broderick, Springboro, OH (US); Judson Sloan Marte, Troy, NY (US); Andrew Philip Woodfield, Maineville, OH (US); Eric Allen Ott, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 168 days.

(21) Appl. No.: 17/000,888

(22) Filed: Aug. 24, 2020

(65) Prior Publication Data

US 2021/0039169 A1    Feb. 11, 2021

Related U.S. Application Data

(63) Continuation of application No. 14/630,108, filed on Feb. 24, 2015, now Pat. No. 10,780,501.

(30) Foreign Application Priority Data

Feb. 25, 2014    (CN) .......................... 201410065130.3

(51) Int. Cl.
*B22F 5/00*    (2006.01)
*B22F 3/105*    (2006.01)
(Continued)

(52) U.S. Cl.
CPC .................. *B22F 5/00* (2013.01); *B22F 3/02* (2013.01); *B22F 3/04* (2013.01); *B22F 3/12* (2013.01);
(Continued)

(58) Field of Classification Search
None
See application file for complete search history.

(56) References Cited

U.S. PATENT DOCUMENTS

| 4,582,536 A | 4/1986 | Raybould |
| 4,643,322 A | 2/1987 | Dickson |

(Continued)

FOREIGN PATENT DOCUMENTS

| CN | 1524649 A | 9/2004 |
| CN | 1861296 A | 11/2006 |

(Continued)

OTHER PUBLICATIONS

Machine Translated Japanese Search Report Corresponding to Application No. 2015034847 dated Jan. 8, 2019.
(Continued)

*Primary Examiner* — Anthony M Liang
(74) *Attorney, Agent, or Firm* — Dority & Manning, P.A.

(57)    ABSTRACT

A method of manufacturing a three-dimensional target object may include forming a shell from loose machining powder using an additive manufacturing process and subjecting the shell to a densification process to form a target object. The shell may define an enclosure that contains additional machining powder. The densification process may include causing metallurgical bonding between the shell and additional machining powder contained in the enclosure defined by the shell and shrinking and/or distorting the shape of the shell to conform the target object to a three-dimensional model for the target object. The shell may include a (Continued)

plurality of layers and/or parts that differ at least in respect of density. The plurality of layers and/or parts may be configured based at least in part on the shrinking and/or distorting to the shape of the shell needed to conform the target object to the three-dimensional model for the target object.

20 Claims, 12 Drawing Sheets

(51) Int. Cl.

| | | |
|---|---|---|
| B22F 3/12 | (2006.01) | |
| B22F 3/15 | (2006.01) | |
| B22F 3/02 | (2006.01) | |
| B22F 3/04 | (2006.01) | |
| B22F 3/26 | (2006.01) | |
| B22F 7/04 | (2006.01) | |
| B23K 15/00 | (2006.01) | |
| B22F 10/20 | (2021.01) | |
| B22F 10/00 | (2021.01) | |
| B23K 26/34 | (2014.01) | |
| B33Y 10/00 | (2015.01) | |

(52) U.S. Cl.
CPC .............. *B22F 3/1208* (2013.01); *B22F 3/15* (2013.01); *B22F 3/26* (2013.01); *B22F 7/04* (2013.01); *B22F 10/00* (2021.01); *B22F 10/20* (2021.01); *B23K 15/0086* (2013.01); *B23K 26/34* (2013.01); *B22F 2998/10* (2013.01); *B33Y 10/00* (2014.12); *Y02P 10/25* (2015.11)

(56) References Cited

U.S. PATENT DOCUMENTS

| | | | |
|---|---|---|---|
| 5,147,086 | A | 9/1992 | Fujikawa et al. |
| 5,561,834 | A | 10/1996 | Score |
| 5,640,667 | A | 6/1997 | Freitag et al. |
| 5,816,090 | A | 10/1998 | Hodge et al. |
| 6,737,017 | B2 | 5/2004 | Woodfield et al. |
| 7,329,381 | B2 | 2/2008 | Woodfield et al. |
| 7,497,876 | B2 | 3/2009 | Tuke et al. |
| 7,540,996 | B2 | 6/2009 | Bampton |
| 7,897,103 | B2 | 3/2011 | Ott et al. |
| 9,227,365 | B2 | 1/2016 | Divosky et al. |
| 2001/0001640 | A1 | 5/2001 | Miller et al. |
| 2004/0182201 | A1 | 9/2004 | Fuwa et al. |
| 2009/0121393 | A1 | 5/2009 | Abe |
| 2010/0291401 | A1 | 11/2010 | Medina et al. |
| 2011/0027120 | A1 | 2/2011 | Goller et al. |
| 2011/0044840 | A1 | 2/2011 | Goller et al. |
| 2011/0311389 | A1 | 12/2011 | Ryan et al. |
| 2012/0222306 | A1 | 9/2012 | Mittendorf et al. |
| 2013/0004680 | A1 | 1/2013 | Godfrey et al. |
| 2013/0039799 | A1 | 2/2013 | Bono et al. |
| 2013/0071562 | A1 | 3/2013 | Szuromi et al. |
| 2014/0163717 | A1 | 6/2014 | Das et al. |
| 2015/0017475 | A1 | 1/2015 | Ward-Close |
| 2015/0030494 | A1 | 1/2015 | Ward-Close |
| 2015/0041025 | A1 | 2/2015 | Wescott et al. |
| 2016/0052087 | A1 | 2/2016 | O'Neill |

FOREIGN PATENT DOCUMENTS

| | | |
|---|---|---|
| CN | 101309766 A | 11/2008 |
| CN | 101391302 A | 3/2009 |
| CN | 103025506 A | 4/2013 |
| EP | 0354376 A1 | 2/1990 |
| EP | 0446673 A1 | 9/1991 |
| EP | 0895974 A1 | 2/1999 |
| EP | 2551040 A1 | 1/2013 |
| GB | 2257161 A | 1/1993 |
| GB | 2499699 A | 8/2013 |
| GB | 2500461 A | 9/2013 |
| JP | S5487615 A | 7/1979 |
| JP | 2000/192168 A | 7/2000 |
| JP | 2000/517375 A | 12/2000 |
| JP | 2001/152204 A | 6/2001 |
| JP | 2001/522722 A | 11/2001 |
| JP | 2005/171299 A | 6/2005 |
| JP | 2005/335203 A | 12/2005 |
| JP | 2015/516299 A | 6/2015 |
| WO | WO2009/024258 A1 | 2/2009 |
| WO | WO2013/013814 A2 | 1/2013 |
| WO | WO2013124649 A1 | 8/2013 |

OTHER PUBLICATIONS

European Search Report Corresponding to Application No. 20164313 dated Jun. 23, 2020.

Machine Translated Japanese Search Report Corresponding to Application No. 20192063666 dated Nov. 17, 2020.

Das et al., "Processing of Titanium New Shapes by SLS/HIP", Material and Design, vol. 20 No. 2/03, London, Jun. 1, 1999, pp. 115-121.

Knight et al., "Metal Processing Using Selective Laser Sintering and Hot Isostatic Pressing (SLSIHIP)", Dec. 31, 1996, pp. 349-350, http://sffsymposium.engr.utexas.edu/MAnuscripts/1996/1996-42-Kinght.pdf.

Chinese Office Action Corresponding to CN201410065130.3 dated Jun. 3, 2016.

Fourth Chinese Office Action & Supplementary Search Corresponding to CN201410065130.3 dated Mar. 22, 2018.

European Search Report & Opinion Corresponding to EP15156525.6 dated Feb. 8, 2016.

Christensen et al., Qualification of Electron Beam Melted (EBM) Ti6AI4V-ELI for Orthopaedic Applications, Medical Device Materials IV:; Proceedings from the Materials & Processes for Medical Devices Conference, Palm Desert, California, Sep. 23-25, 2007.

Fukang, Isostatic Technology, Metallurgical Industry Press Publishing, Mar. 1992, pp. 1-11.

Hiemenz, Rapid Prototypes Move to Metal Components, Stratasys Inc., Mar. 9, 2007.

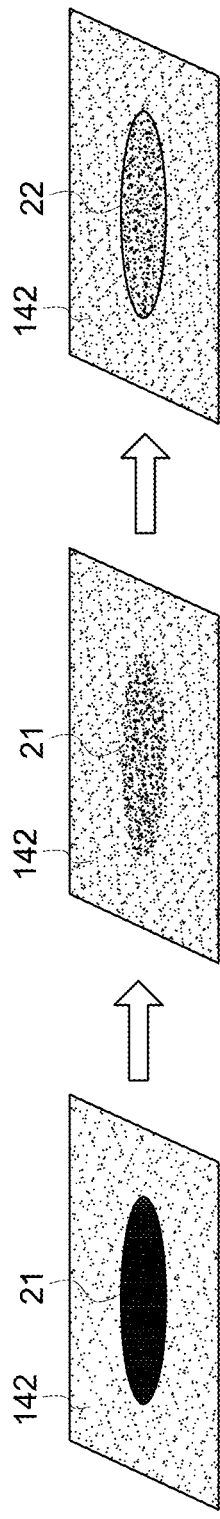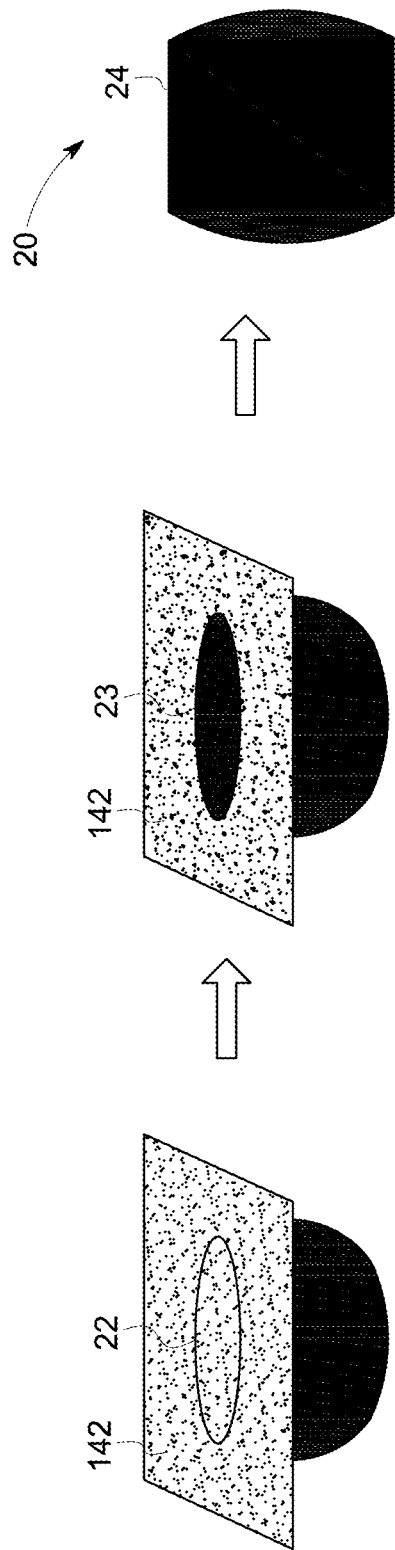

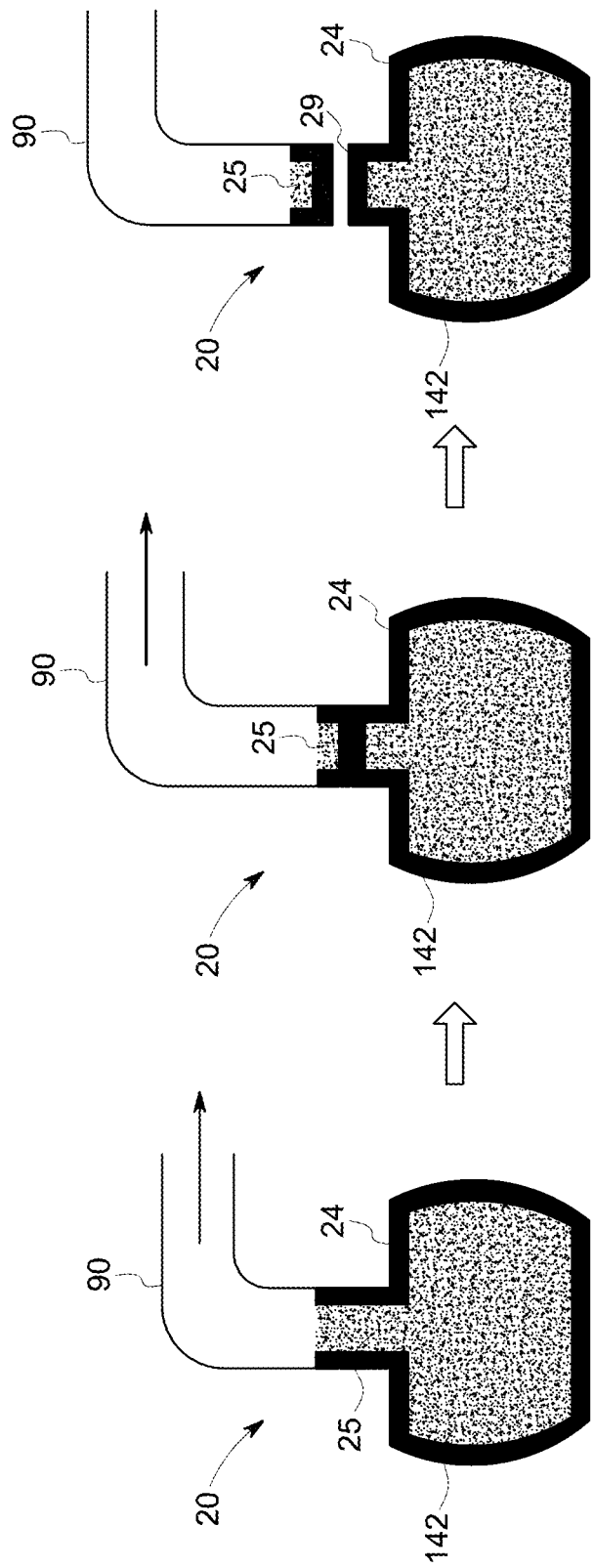

METHOD FOR MANUFACTURING OBJECTS USING POWDER PRODUCTS

CROSS-REFERENCE TO RELATED APPLICATIONS

This application is a continuation of U.S. application Ser. No. 14/630,108, filed Feb. 24, 2015, which claims the benefit of priority under 35 USC 119 to earlier-filed China Patent Application 201410065130.3, filed Feb. 25, 2014, the contents of each such application are incorporated herein by reference in their entirety as if set forth verbatim.

TECHNICAL FIELD

Embodiments of the technology relate generally to manufacturing methods, and in particular, to a three-dimensional object manufacturing method using powder products.

BACKGROUND

For the production of complex and high performance articles, powder metallurgical processing has been used and often provides significant advantages over other casting and wrought processing routes. Multiple techniques have been developed to process powder or particulate materials into bulk essentially fully dense articles including pressing and sintering, canning and densification, and additive manufacturing. In each of these techniques, the complexity and production cost of the processing must be considered in defining effective routes for production of articles. Cost of the raw material and amount of machining or shaping processing after densification can also significantly affect the selection of optimized processing routes. Processing route may also affect the resulting physical, microstructural, and mechanical properties of the article and so article performance level also may be considered in defining the process route. In order to produce complex and high performance articles, several typical techniques are known in the art.

For complex shaped articles, additive manufacturing processes have been used which have the capability of producing net or near net shapes directly. Electron beam melting (EBM) and direct metal laser melting (DMLM) are examples of types of additive manufacturing for three dimensional articles, especially for metal objects. They are often classified as rapid manufacturing methods because they also have the advantage of being able to produce a part from an electronic definition without the need to produce specialized tooling which can often lead to long lead times for production of articles by other processing routes. Many of the additive processing technologies including EBM and DMLM technologies manufacture three-dimensional objects by melting powder layer by layer with a laser beam or an electron beam in a high vacuum chamber in the case of EBM, and in a chamber, typically under inert gas for DMLM. For example, an EBM or DMLM machine reads data from a three-dimensional model and lays down successive layers of powdered material according to the three-dimensional model. These layers of powdered material are melted together by utilizing a computer controlled electron or laser beam. In this way it builds up the three-dimensional object to be manufactured. The process takes place under vacuum for EBM, while DMLM may be performed under vacuum or inert gas, such as Argon, which makes it suited to manufacture three-dimensional objects of reactive materials with a high affinity for oxygen, e.g. titanium. These techniques are particularly well suited for producing limited numbers of parts at low or intermediate volumes due to the typical deposition rates used. However, when the number of the three-dimensional objects to be manufactured is quite large, the whole manufacturing process may take much more time. This will require more EBM and/or DMLM machines to be used to meet the throughput which will increase the investment.

For more simple shaped and larger articles, canning and densification processing of powders is also used. With these powder metallurgical processes, materials are typically placed into a can that isolates the materials from the surrounding environment and provides a transfer medium for further processes, such as hot isostatic pressing (HIP) and pneumatic isostatic forging (PIF). Cans are typically fabricated from sheet materials and welded into the shape of interest to make an article. Cans are oversized versus the desired final product size and shape in order to account for shrinkage than occurs during densification. Cans can be filled with loose powder or may be used to encapsulate pressed or semi porous powder preforms. Cans provide a manner in which the powder materials may be mechanically pressed into a porous or semi-porous object which is suitable for handling, transfer, and consolidation or densification into a target object. However, the use of the can requires several extra steps and leads to higher yield loss (due in part to interaction between the materials and the can material), thus reducing efficiency and increasing cost. Can cost and complexity can contribute significantly to the overall cost and time needed to produce powder articles or objects.

Whether processed by additive manufacturing processes or by canning of loose partially densified compacts, powder derived materials are frequently subjected to densification processes that utilize elevated temperature, pressures, or both, in order to fully densify the structure. Some examples of such processing include sintering, hot pressing, and hot isostatic pressing (HIP). Additionally, U.S. Pat. No. 5,816,090 discloses a process for the consolidation of powder objects using pneumatic isostatic forging (PIF). Rather than applying heat and pressure simultaneously over a longer period of time, as in the typical HIP process, the '090 patent relies on high temperatures and higher pressures over a short period of time in a pneumatic isostatic forging process. The '090 patent describes only partially sealing the outer surface of the workpiece, or coating the workpiece with a potentially reactive material, prior to the "pre-sintering" step disclosed therein. The '090 patent therefore discloses solutions that apply only to the process described therein and relies on extra steps not used in typical HIP processes.

Pressing and sintering processes are also used whereby powders are put into a die and pressed into a shape, released from the die and then sintered at high temperatures in order to densify by diffusion. In this processing route, higher part volumes may be feasible but resulting articles are typically limited in geometry and ultimate density level and may be inferior to other powder metallurgical processing routes.

Frequently powder metallurgical processing is used in order to produce high performance materials with properties that are difficult or impossible to achieve using standard casting and wrought processing methods. Processing routes that involve solid state processing (press and sinter, or can and densify, for example) may be advantageous over fusion based additive processing routes in that fine scale microstructural features may be maintained through processing and no solidification type structures may be produced during processing. Such constraints can also make optimum processing difficult for complex high performance materials.

For these and other reasons, there is a need for increasing efficiency and saving cost in the rapid manufacturing field, and in particular, in densification processes involving powder metallurgy processing and subsequent densification by processes such as HIP and/or PIF.

SUMMARY

One or more aspects are summarized in the present invention to facilitate a basic understanding of the present invention, where the induction of the present invention do not extend the overview, and is neither intended to identify certain elements of the present invention, nor intended to draw out of its range. On the contrary, the main purpose of the induction is to present some concepts of the present invention in a simplified form before more detailed descriptions are presented below.

An aspect of the present invention is to provide a method for manufacturing a three-dimensional part. The method includes: performing partial densification processing on loose machining powder, to form a densified and sealed enclosure, where there is still loose machining powder accommodated inside the enclosure; and performing overall densification processing on the enclosure and the machining powder inside the enclosure, so as to implement metallurgical bonding between the machining powder inside the enclosure and the enclosure during the densification, thereby forming a target three-dimensional part.

Another aspect of the present invention is to provide another method for manufacturing a three-dimensional part. The method includes: performing partial densification processing on loose machining powder by using an EBM technology, to form a densified and sealed vacuum enclosure, where there is still loose machining powder accommodated inside the enclosure; repeating the foregoing step until a predetermined number of the enclosures that accommodate the loose machining powder are machined; and performing overall densification processing simultaneously on the predetermined number of the enclosures that accommodate the loose machining powder, so as to implement metallurgical bonding between the machining powder inside the several enclosures and a corresponding enclosure during the densification, thereby simultaneously forming the predetermined number of target three-dimensional parts.

Yet another aspect of the present invention is to provide another method for manufacturing a three-dimensional part. The method includes: performing partial densification processing on loose machining powder by using an additive manufacturing technology, to form a densified enclosure with an airway tube, where there is still loose machining powder accommodated inside the enclosure; connecting the airway tube to an air-extracting apparatus to discharge gas from the enclosure; performing sealing processing on the enclosure after a vacuum degree inside the enclosure reaches a predetermined value; repeating the foregoing step until a predetermined number of sealed vacuum enclosures that accommodate the loose machining powder are machined; and performing overall densification processing simultaneously on the predetermined number of the enclosures that accommodate the loose machining powder, so as to implement metallurgical bonding between the machining powder inside the several enclosures and a corresponding enclosure during the densification, thereby simultaneously forming the predetermined number of target three-dimensional parts.

Yet another aspect of the present invention is to provide another method for manufacturing a three-dimensional part. The method includes: performing first densification processing on loose machining powder, to form a permeable porous half-finished part having a first density level; performing second densification processing on an outer surface area of the half-finished part, to form the outer surface area into a sealed enclosure having a second density level; and performing overall densification processing on the outer surface area having the second density level and an inner area having the first density level, to form a target three-dimensional part.

Compared with the prior art, in the present invention, a three-dimensional part is manufactured and machined in steps. First, selective enclosure machining is performed on loose machining powder by using, for example, an additive manufacturing technology. In this way, in a situation in which a large quantity of target parts are to be machined, efficiency is significantly improved and energy consumption is significantly reduced because only an enclosure section, which occupies a very small portion of the entire part, is machined in the step. Then, in a subsequent step of an HIP or PIF technology, overall densification processing is performed simultaneously on the foregoing numerous enclosures that are finished machining and accommodate machining powder, so as to machine numerous target three-dimensional parts at once. Because numerous half-finished parts are machined simultaneously at once in the step, efficiency is also improved, and energy consumption is also reduced. In addition, metallurgical bonding between the enclosure and the machining powder inside the enclosure is implemented in the step without applying a conventional can to aid the machining. In this way, a manufacturing technique is significantly simplified.

BRIEF DESCRIPTION OF THE FIGURES

These and other features, aspects, and advantages of the present technology will become better understood when the following detailed description is read with reference to the accompanying drawings in which like characters represent like parts throughout the drawings, wherein:

FIGS. 3A-3F respectively show a schematic view of different manufacturing statuses of the shell of the target object manufactured by the EBM machine of FIG. 1 in another aspect;

FIGS. 8A-8D, and FIGS. 9A-9C, respectively, show two schematic views of different manufacturing statuses of a shell containing powder of a target object manufactured by an SLM method according to an implementation manner of the invention;

DETAILED DESCRIPTION

Embodiments of the present disclosure will be described with reference to the accompanying drawings. In the subsequent description, well-known functions or constructions are not described in detail to avoid obscuring the disclosure in unnecessary detail.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation. Moreover, the terms "coupled" and "connected" are not intended to distinguish between a direct or indirect coupling/connection between two components. Rather, such components may be directly or indirectly coupled/connected unless otherwise indicated.

Figure 1:
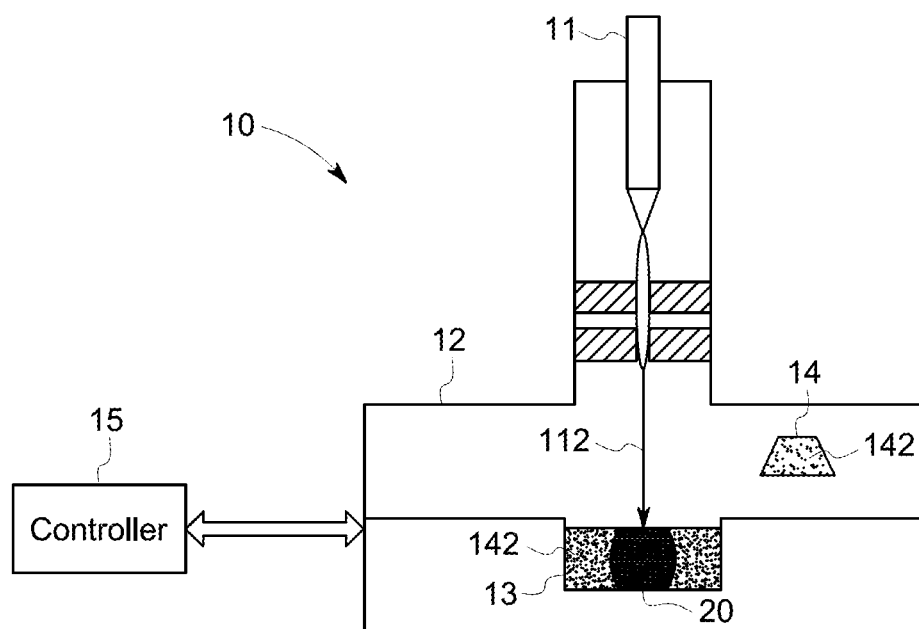
FIG. 1 is a schematic view of an exemplary EBM machine for manufacturing a shell containing powder of a target object.

Referring to FIG. 1, an exemplary EBM machine 10 for manufacturing three-dimensional objects is shown. For ease of explanation, only certain parts of the EBM machine 10 are shown in FIG. 1. As an example, the EBM machine 10 includes an electron beam gun 11, a vacuum chamber 12, a building table 13, a powder container 14, and a controller 15. In other embodiments, the EBM machine 10 may have other different configurations. Moreover, rather than utilizing an EBM machine, alternative embodiments may utilize any possible manner of emitting energy or heat, including, but not limited to, direct metal laser melting, laser sintering, and infrared.

The electron beam gun 11 is used to generate an electron beam 112 to melt powder 142 located on the building table 13 layer by layer according to a three-dimensional model stored in the controller 15, to build a target three-dimensional object which has the same shape as the three-dimensional model. The powder container 14 is used to contain the powder 142 and deliver the powder 142 onto the building table 13 layer by layer according to control signals from the controller 15. The controller 15 controls the electron beam gun 11, the vacuum chamber 12, the building table 13, and the powder container 14 according to predetermined control programs, and the whole manufacturing process is under vacuum environment in the vacuum chamber 12. It is understood that the EBM machine 10 may include other additive parts, such as power supplies, communication interfaces, etc.

Figure 5:
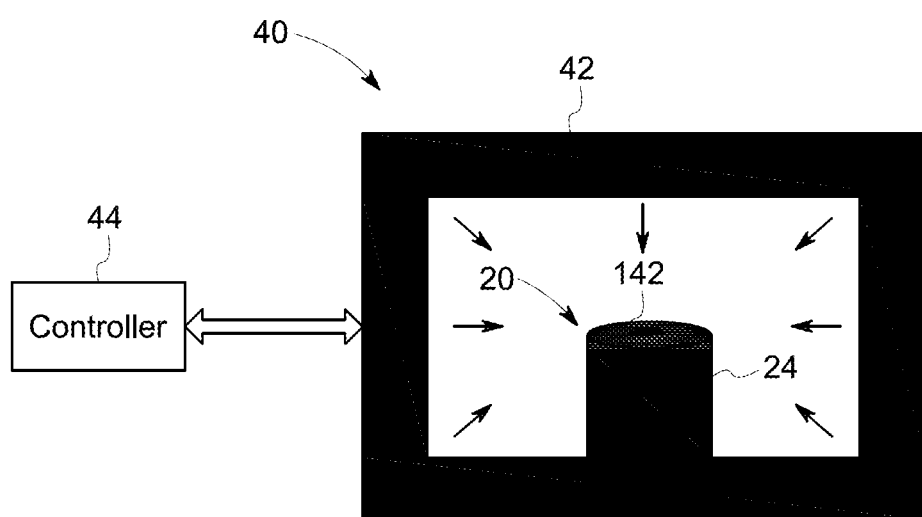
FIG. 5 is a schematic view of an exemplary HIP machine for manufacturing the shell containing powder of the target object manufactured by the EBM machine of FIG. 1 in a finished status.

Referring to FIG. 1, FIGS. 2A-2D, and 3A-3F, together, some different manufacturing statuses of a shell 24 containing the powder 142 of a target object 20 manufactured by the EBM machine 10 is shown. For ease of explanation, a target object 20 shown in FIG. 5 is a columnar solid element. In other embodiments, the shape of the target object 20 may vary according to different requirements. The target object 20 shown in FIGS. 2A-2D and 3A-3F is an unfinished target object 20. In FIGS. 2A-2D and 3A-3F, the shell 24 of the target object 20 is not exactly columnar-shape because the shell 24 needs to be compensated in this EBM manufacturing process before the subsequent HIP manufacturing process. After HIPping the shell 24 containing powder 142 manufactured by the EBM machine 10, the target object 20 may be manufactured to the expected columnar-shape, which will be described in the following paragraphs.

Figures 2A, 2B:
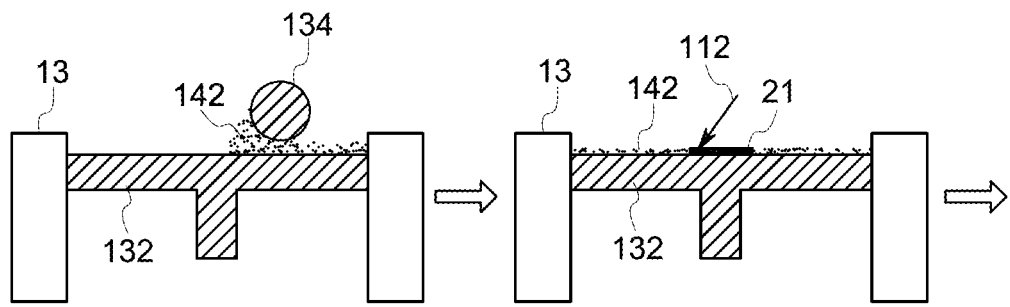
FIGS. 2A-2D respectively show a schematic view of different manufacturing statuses of the shell of the target object manufactured by the EBM machine of FIG. 1.
Figures 2C, 2D:
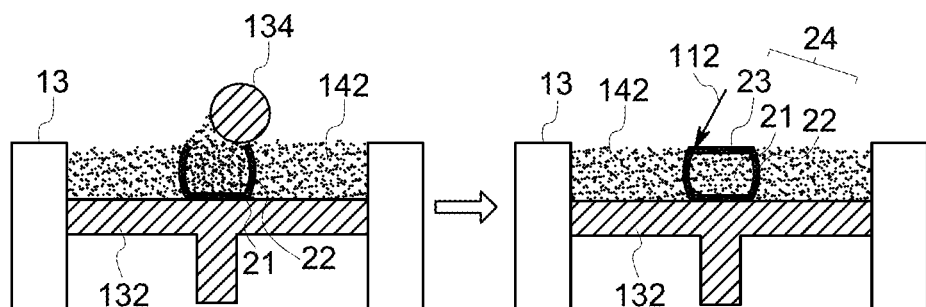

In a beginning status shown in FIG. 2A, a first layer of the powder 142 is delivered onto a building platform 132 of the building table 13, for example by using a roller 134 to smoothly push the powder 142 onto the building platform 132. After the first layer of the powder 142 is laid on the building platform 132 evenly, a bottom surface 21 of the shell 24 is manufactured by using the electron beam 112 to melt the corresponding part of the first layer of the powder 142 according to the three-dimensional model, as shown in the status shown in FIG. 2B, and also shown in the status shown in FIG. 3A.

After the bottom surface 21 of the shell 24 is finished, a side surface 22 of the shell 24 is manufactured by using the electron beam 112 to melt the corresponding part of subsequent powder 142 layer by layer according to the three-dimensional model. As shown in the status shown in FIG. 3B, a second layer of the powder 142 is put onto the building platform 132, and a first layer of the side surface 22 is manufactured by using the electron beam 112 to melt the corresponding part of the second layer of the powder 142 according to the three-dimensional model as shown in the status shown in FIG. 3C. The remaining layers of the side surface 22 are formed by the same manufacturing method as the first layer, and are not described in any further detail. The status shown in FIG. 2C and the status shown in FIG. 3D both show an intermediate status which is to manufacture one layer of the side surface 22.

After the side surface 22 is finished, a top surface 23 of the shell 24 is manufactured by using the electron beam 112 to melt the corresponding part of last layer of the powder 142 according to the three-dimensional model. As shown in the status shown in FIG. 2D and the status shown in FIG. 3E, the last layer of the powder 142 is laid onto the building platform 132 and then the top surface 23 is manufactured by using the electron beam 112 to melt the corresponding part of the last layer of the powder 142 according to the three-dimensional model. Finally, a whole shell 24 is finished and it also contains loose powder 142, or a mixture of loose powder and rapidly sintered supported patterns inside, as described in more detail below. In other words, after the EBM manufacturing, the target object 20 including the shell 24 and the powder 142 inside of the shell 24 as shown in the status shown in FIG. 3F is finished. The loose powder 142 may also be sintered using a faster scanning speed to below a predetermined density, for example 80%. The shell 24 is thus formed as a vacuum sealed three-dimensional shell having a predetermined internal porosity.

Compared to the target object 20, the shell 24 is not finished yet and has at least one unfinished part containing loose powder 142 or a mixture of loose powder and rapidly sintered supporting patterns which will be manufactured by a further manufacturing method. Here, the target object 20 is further manufactured by HIPping as described below. However, in other embodiments, the treatment and densification process may be other than HIP. For example, PIF or another densification process may be utilized.

Figure 4:
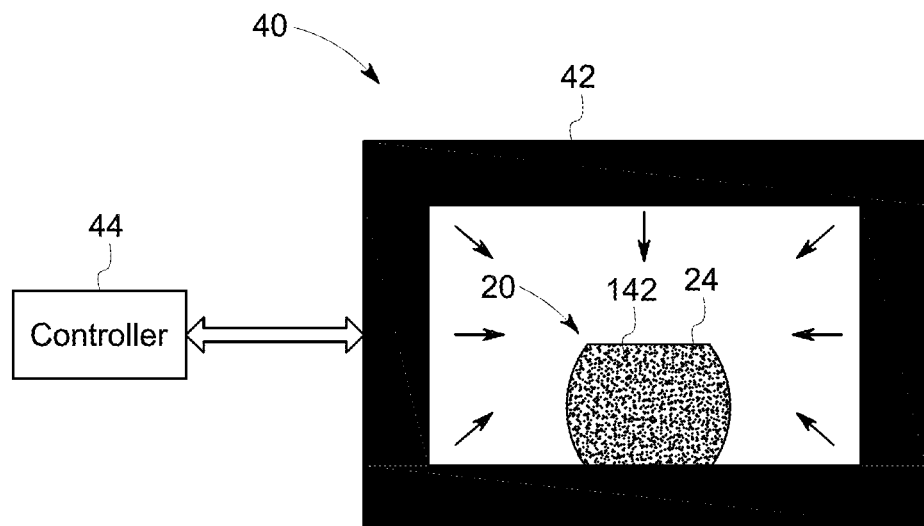
FIG. 4 is a schematic view of an exemplary HIP machine for manufacturing the shell containing powder of the target object manufactured by the EBM machine of FIG. 1 in a beginning status.

Referring to FIG. 4, the shell 24 is put into a high pressure containment vessel 42 of a HIP machine 40. The HIP machine 40 may further include a controller 44 used to control temperature and pressure inside of the vessel 42, which can provide a HIPping force to the shell 24 full of powder 142 and any supporting patterns that may be present. It is understood that the HIP machine 40 may include other additive parts, such as power supplies, communication interfaces, etc.

In a beginning status shown in FIG. 4, the shape of the shell 24 still maintains the compensated shape, which is bigger than the expected shape of the target object 20. According to predetermined program, the controller 44 will control the temperature and pressure in the vessel 42, to provide a HIP treatment to the shell 24. During the HIP treatment process, the shell 24 will press the loose powder 142 and any supporting patterns present to make it solid and metallurgically bond with the shell 24. After finishing the HIP treatment, a solid target object 20 is manufactured as shown in FIG. 5. In FIG. 5, the powder 142 has become the same or nearly the same density as the shell 24, which means the shell 24 and the loose powder 142 and any supporting patterns become one target object 20 to be manufactured, and the shape of the target object 20 becomes the expected columnar-shape as an example.

Figure 6:
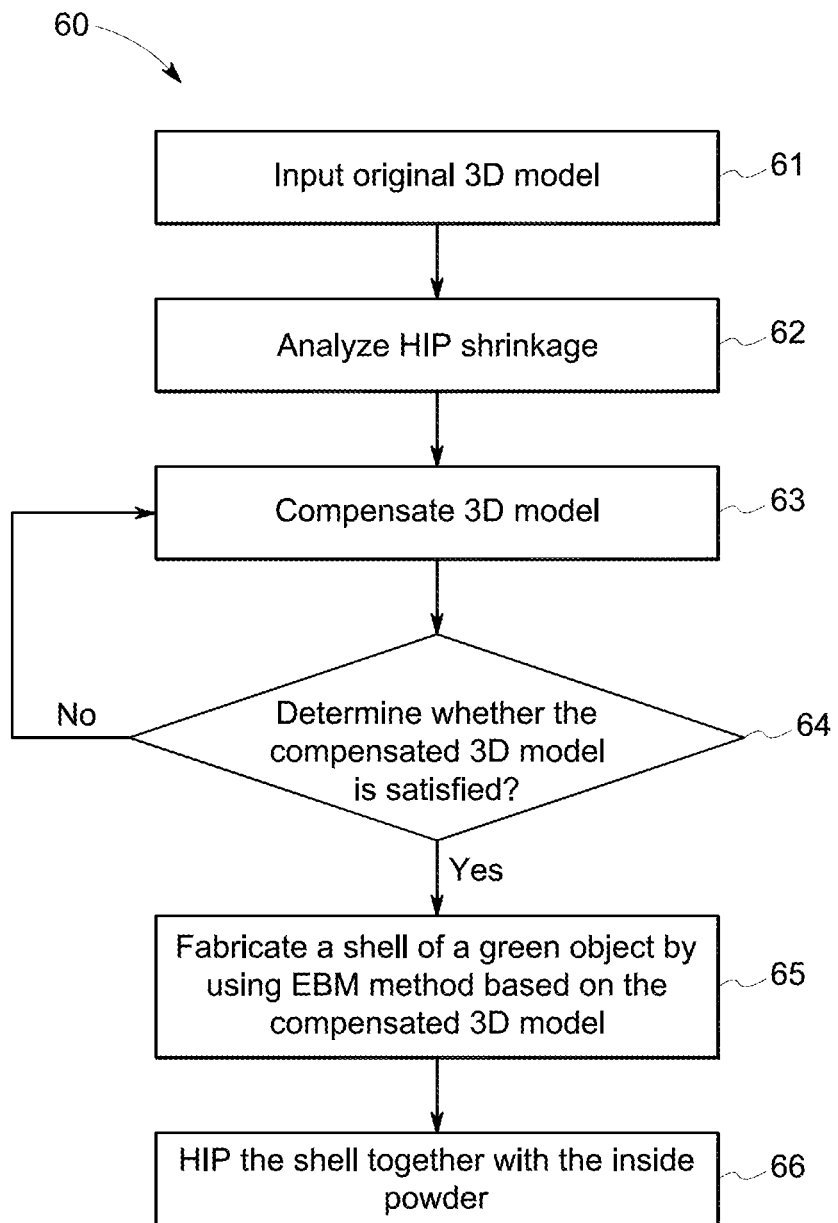
FIG. 6 is a flowchart of a method for manufacturing a three-dimensional object, according to one embodiment.
Figure 7:
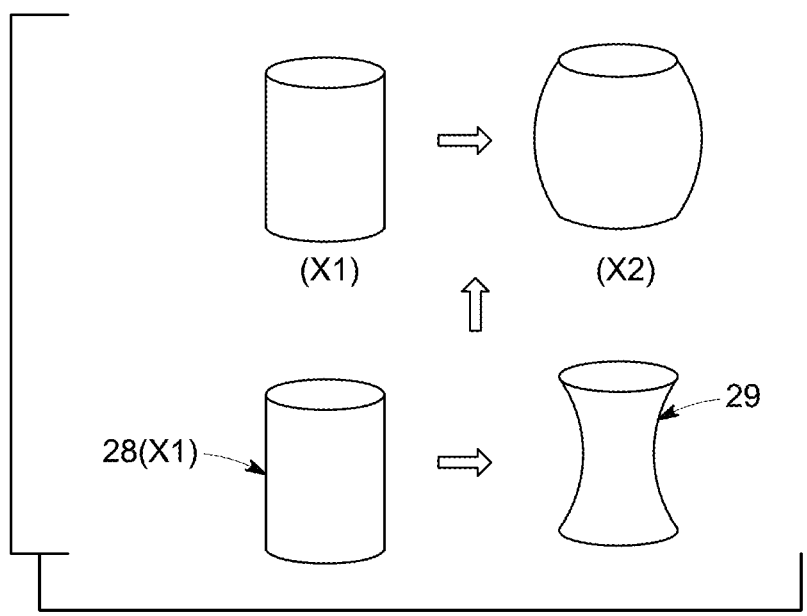
FIG. 7 is a schematic view of an original three-dimensional model and a compensated three-dimensional model according to an implementation manner of the invention.
Figures 8A, 8B:
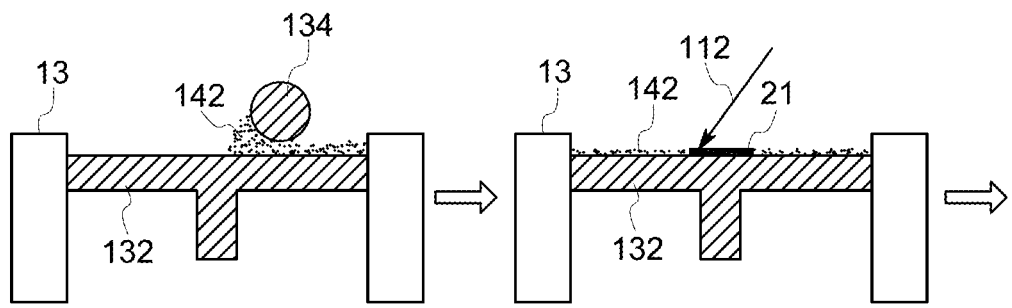
Figures 8C, 8D:
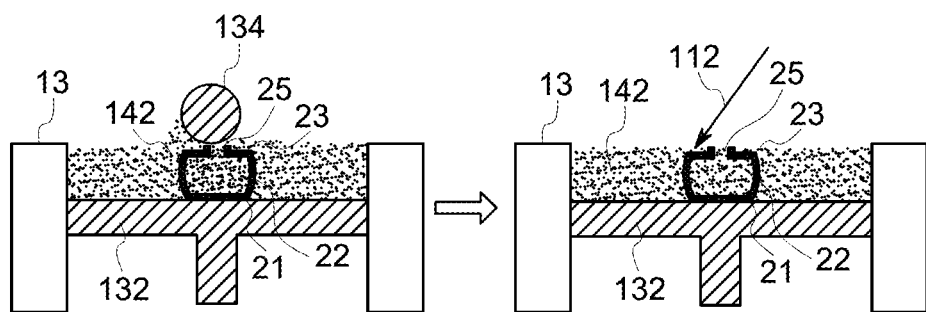

Referring to FIG. 6, a flowchart of a method 60 for manufacturing the target three-dimensional object 20, according to one embodiment is shown. The method 60 begins in step 61, an original three-dimensional model is input/stored preferably into the controller of an EBM machine. The original three-dimensional model is the same as the target object 20. For example, FIG. 7 shows an original three-dimensional model X1 which is columnar-shaped. In some embodiments, the three-dimensional model is a three-dimensional computer aided design (CAD) model.

In step 62, the original three-dimensional model X1 is analyzed to determine what the shrinkage/distortion change 29 would be after a shell 28 containing loose powder having the same shape as the original three-dimensional model X1 is treated by the HIP process. It is understood that the analysis of the shrinkage change of the shell containing powder can be simulated and analyzed based on appropriate algorithms, such as by using a finite element method (FEM) tool of ANSYS software. The detailed analysis process is not disclosed here.

In step 63, according to above shrinkage change analysis result, a compensated three-dimensional model is calculated based on appropriate algorithms, such as also by using the ANSYS software. For example, FIG. 7 shows a compensated three-dimensional model X2 which is bigger than the columnar-shaped original three-dimensional model X1.

In step 64, the compensated three-dimensional model X2 is analyzed to determine if a shell containing powder having the same shape of the compensated three-dimensional model X2 will be changed to the same shape as the original three-dimensional model X1 after being treated by the HIP process. If yes, the process goes to next step 65. If no, the process goes back the previous step 63. It is also understood that this analysis can be simulated based on appropriate algorithms, such as by using the FEM tool of ANSYS software, which are not described here. It is also understood that, in this and other embodiments, the powder size distribution is a key factor affecting packing density and subsequent shrinkage. Preferably the analysis in steps 61-64 are incorporated into the controller of the EBM machine. Alternately the analysis in steps 61-64 may be performed in a separate system then the output transferred to the controller for the subsequent steps 65 and on.

In step 65, a shell 24 full of loose powder 142 and any additional supporting patterns is manufactured by using the EBM method based on the compensated three-dimensional model X2, which has been described above.

In step 66, the shell 24 containing the loose powder 142 and any supporting patterns is formed into the target three-dimensional object 20 by using the HIP method, which also has been described above.

According to above method 60, a target object 20 (for example shown in FIG. 5) is manufactured by combining the EBM method and the HIP process. As only the shell 24 is manufactured by the EBM process, and not the whole target object 20, the power used by the electron beam 112 is reduced and time may be saved as well. If several target objects 20 need to be manufactured, those corresponding shells 24 with the loose powder 142 and any supporting patterns can be HIP treated in the vessel 42 at the same time, which can increase efficiency. Furthermore, the shell 24 will become one part of the target object 20 through metallurgical bonding with the powder 142 after the HIP treatment, which can further simplify the manufacturing process.

In other embodiments, instead of using the EBM method, the shell 24 together with loose powder 142 and any supporting patterns can be manufactured by other rapid manufacturing methods, such as selective laser melting (SLM) and direct metal laser melting (DMLM) methods under the non-vacuum condition, which are respectively performed in a SLM machine and a DMLM machine. Notably, however, both SLM and DMLM can also be performed under vacuum.

Referring to FIGS. 8A-8D and 9A-9C, two schematic views for showing different manufacturing statuses of the shell 24 manufactured by the SLM method is shown. Compared with the EBM method shown in FIGS. 2A-2D, the SLM method of FIGS. 8A-8D may be performed in non-vacuum condition. Furthermore, the SLM method may further manufacture a duct 25 that may extend from the top surface 23. In other embodiments, the duct 25 may extend from the side surface 22.

Referring to FIGS. 9A-9C, after the shell 24 including the duct 25 and containing the loose powder 142 and any supporting patterns is finished, an air pump (not shown) is used to pump air and/or remnant inert gas from the shell 24 through a pipe 90 communicated with the duct 25, which make the inside space of the shell 24 is vacuum (see FIG. 9A). In some embodiments, the duct 25 is quite long or the pipe 90 is quite long along the vertical direction, thus the loose powder 142 cannot be removed out from the shell 24. In some embodiments, the shell 24 can be placed in a big vessel having an outlet (not shown), then the air pump is used to pump air from the big vessel through the outlet, thus the air inside of the shell 24 is indirectly pumped out without removing the loose powder 142. The air inside of the shell 24 can also be pumped out according to other modes.

When a vacuum level of the inside space of the shell 24 is satisfied according to a predetermined value, for example when the vacuum level is lower than about 0.01 Pascal, the extended duct 25 is sealed through appropriated methods, such as by an appropriated welding method (see FIG. 9B). Namely, the inside space of the shell 24 is sealed by a weld part 29. Then, the weld part 29 is cut through appropriated cutting methods (see FIG. 9C), which makes the shell 24 be vacuum, like the shell 24 shown in FIG. 4. Note, the pipe may be locally heated and crimped shut, thus ensuring the vacuum is maintained inside the shell 24. The pipe may be cut above the line of the crimp.

Figure 10:
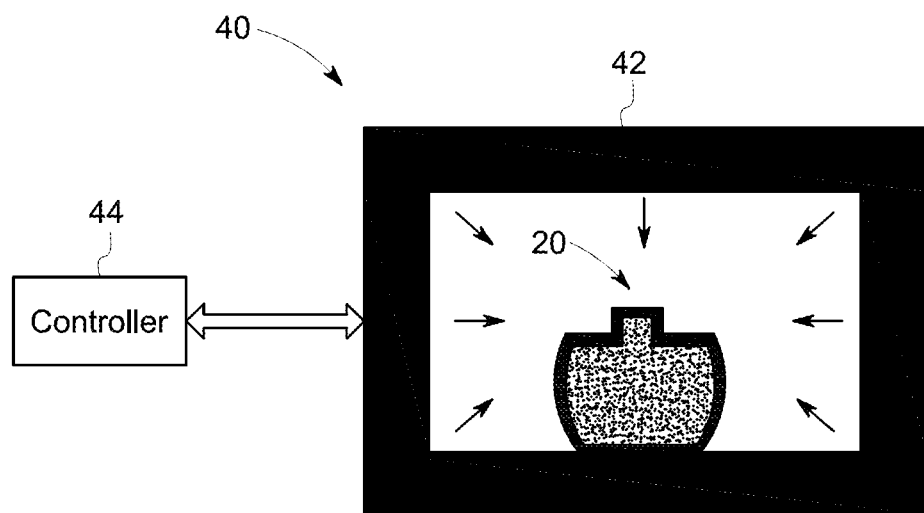
FIG. 10 is a schematic view of an exemplary HIP machine for manufacturing the shell containing powder of the target three-dimensional object manufactured by the Selective Laser Melting (SLM) method of FIGS. 8A-8D and 9A-9C in a beginning status.

Referring to FIG. 10, the sealed shell 24 full of loose powder 142 and any supporting patterns is treated by the HIP machine 40 to form the target object 20. The manufacturing process is similar to that shown in FIG. 4, and thus the process is not described again.

Figure 11:
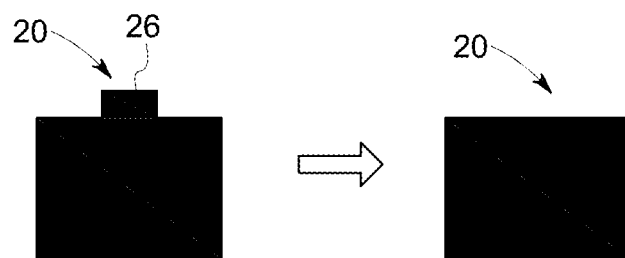
FIG. 11 is a schematic view of a process to cut a duct part from a target object according to an implementation manner of the invention.

Referring to FIG. 11, after the HIP process, a solid target object 20 is formed, but a duct part 26, due to the duct 25, is an additional part on the target object 20. The duct part 26 can be cut by appropriate cutting methods, for example a hydraulic cutting method, etc. After cutting the duct part 26, the target object 20 is finished. Similar to the EBM method combining the HIP method, the SLM method combining the HIP method also can achieve a target object 20 which metallurgically bonds the shell 24 and the powder 142. For clarity the deposition processes such as DMLM, SLM, and EBM can be practiced with or without the duct within the scope of this invention.

Figure 12:
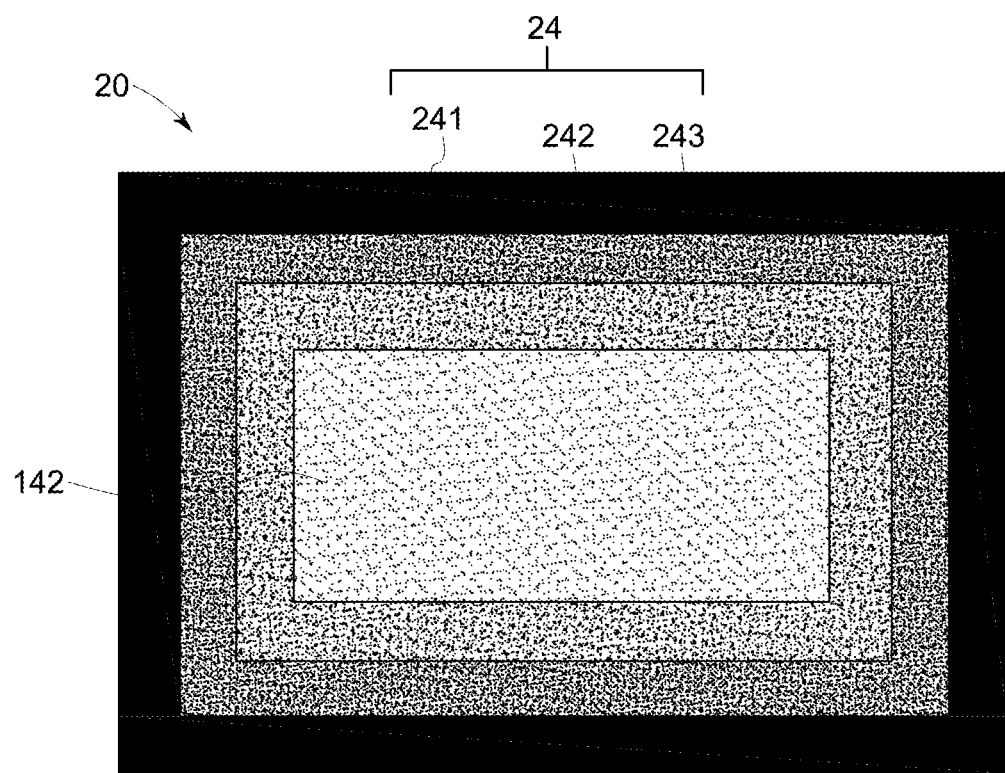
FIG. 12 is a schematic view of a shell containing powder of a target object, according to another embodiment.

In above mentioned embodiments, only the outside shell 24 is finished during the EBM or SLM process. However, in other embodiments, some of the powder 142 inside of the shell 24 also can be melted or sintered into different density levels. In that regard, referring to FIG. 12, a shell 24 of a target object 20 containing loose powder or partially consolidated powder 142 according to another embodiment is shown. Compared with the shell 24 shown in FIG. 4, the shell 24 of FIG. 12 is not a uniform solid shell but includes at least two different density level layers. As an exemplary embodiment shown in FIG. 12, the illustrated shell 24 includes three different density level layers 241, 242, and 243 from outside to inside. The density level from layer 241 to 243 is gradually reduced. For example, the density level of the first layer 241 is about 100%, the density level of the target object, the second layer 242 is about 90%, and the density level of the third layer 243 is about 80%. In other embodiments, the number of the density level layers, the density level of each layer, the thickness of each layer can be adjusted based on appropriate algorithms, such as by using the FEM tool of ANSYS software, which are not described here.

Figure 13:
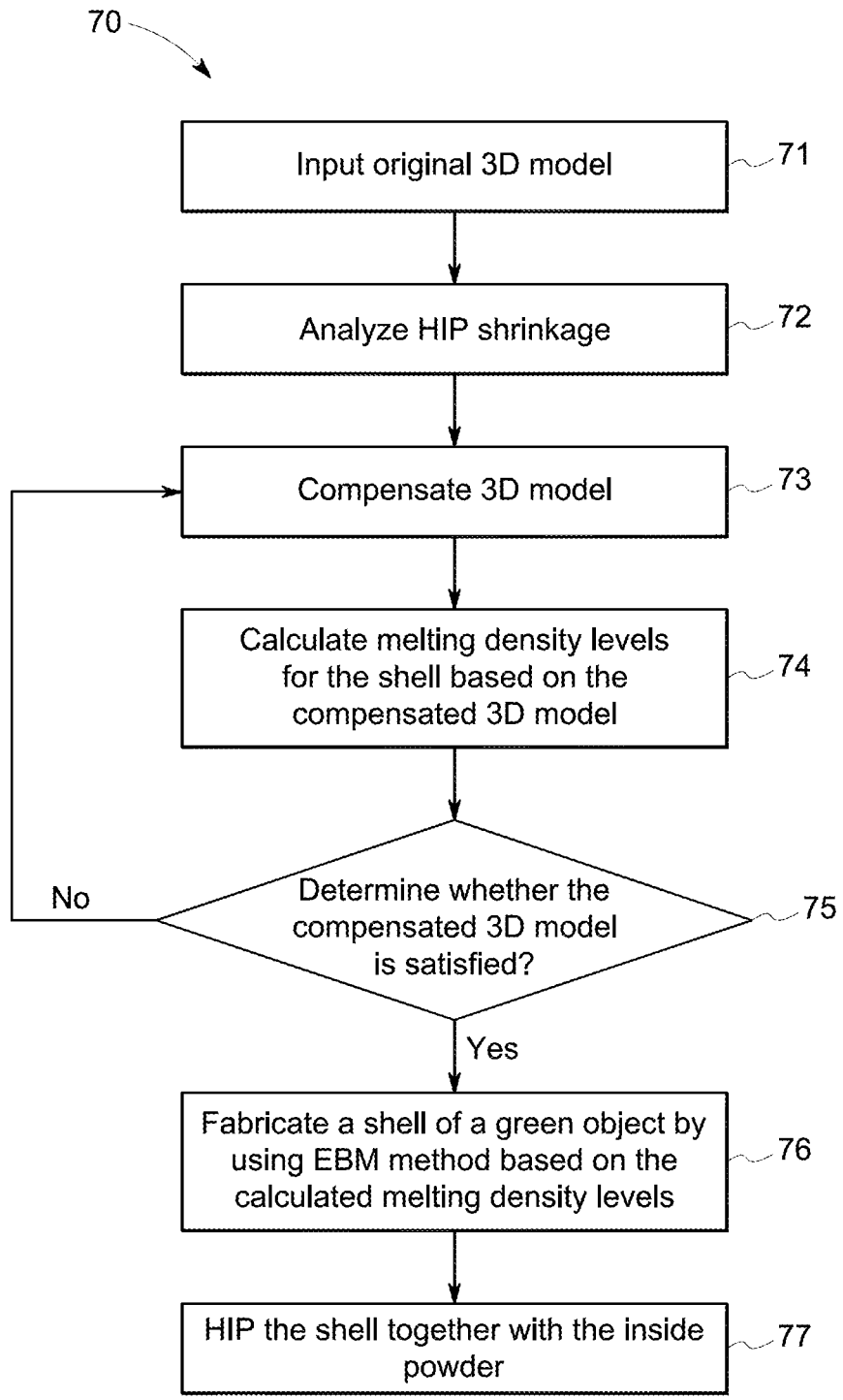
FIG. 13 is a flowchart of a method for manufacturing a target object, according to another embodiment.

Referring to FIG. 13, a flowchart of a method 70 for manufacturing a three-dimensional object, according to another embodiment is shown. Compared with the method 60, the steps 71-73 of the method 70 are the same as the steps 61-63 of the method 60. Thus, the steps 71-73 are not described here.

In step 74, based on the compensated three-dimensional model, the shell 24 is calculated to determine the number of the density level layers (like the layers 241, 242, 243) of the shell 24, the density level of each layer, and the thickness of each layer. As mentioned above, those parameters can be calculated based on appropriate algorithms, such as by using the FEM tool of ANSYS software, which are not described here.

In step 75, the compensated three-dimensional model is analyzed to determine if a shell containing powder and any supporting patterns having the same shape of the compensated three-dimensional model will be changed to the same shape as the original three-dimensional model after being treated by the HIP process. If yes, the process goes to next step 76. If no, the process goes back the previous step 73. This step 75 is similar to the step 64 mentioned above.

In step 76, the shell 24 containing loose powder 142 and any supporting patterns is manufactured by using the EBM method. As the shell 24 includes at least two different density level layers, the electron beam 112 will melt the different density level layers by using different power levels of electron beams according to above calculated parameters of the shell 24. Even though the shell 24 shown in FIG. 12 is thicker than the shell 24 shown in FIG. 4, the power used by the electron beam 112 is still reduced and can save time compared with the conventional EBM methods.

In step 77, the shell 24 containing loose powder 142 and any supporting patterns is manufactured by using the HIP method. After the HIP process, a target solid object 20 (like the object 20 shown in FIG. 5) is finished. Because the shell 24 is manufactured to several different density level layers during the EBM process, the HIP process may more easily and effectively achieve the target solid object 20 compared with the method 60.

Figure 14:
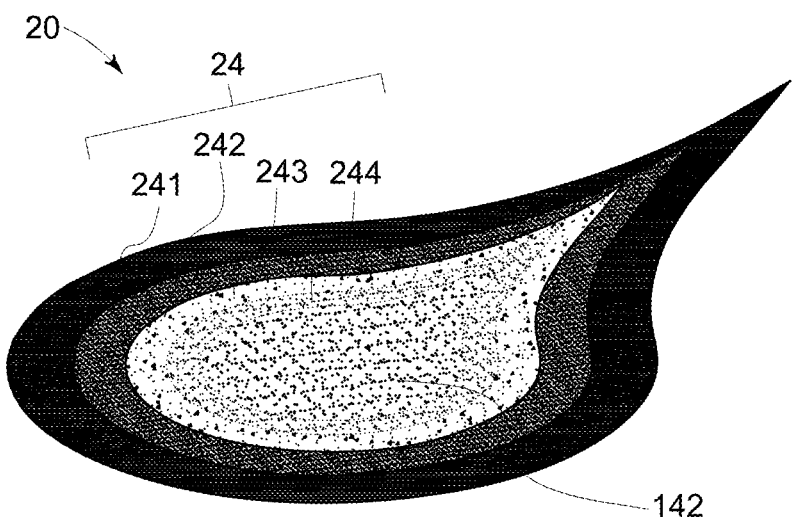
FIG. 14 is a schematic view of a shell containing powder of a target object, according to yet another embodiment.

In other embodiments, the shape of the object 20 may be not regular, such as a tear drop shape. FIG. 14 shows a target object 20 as an example. In the EBM process, the object 20 of FIG. 14 can be manufactured from a shell like the shell 24 shown in FIG. 4, i.e. from a shell of a single density. It should be appreciated that the target object 20 of FIG. 14 can also be manufactured from a shell having several different density level layers, such as 241, 242, 243, and 244 shown in FIG. 14. The detailed parameters can be calculated based on appropriate algorithms, such as by using the FEM tool of ANSYS software, which are not described here.

Figure 15:
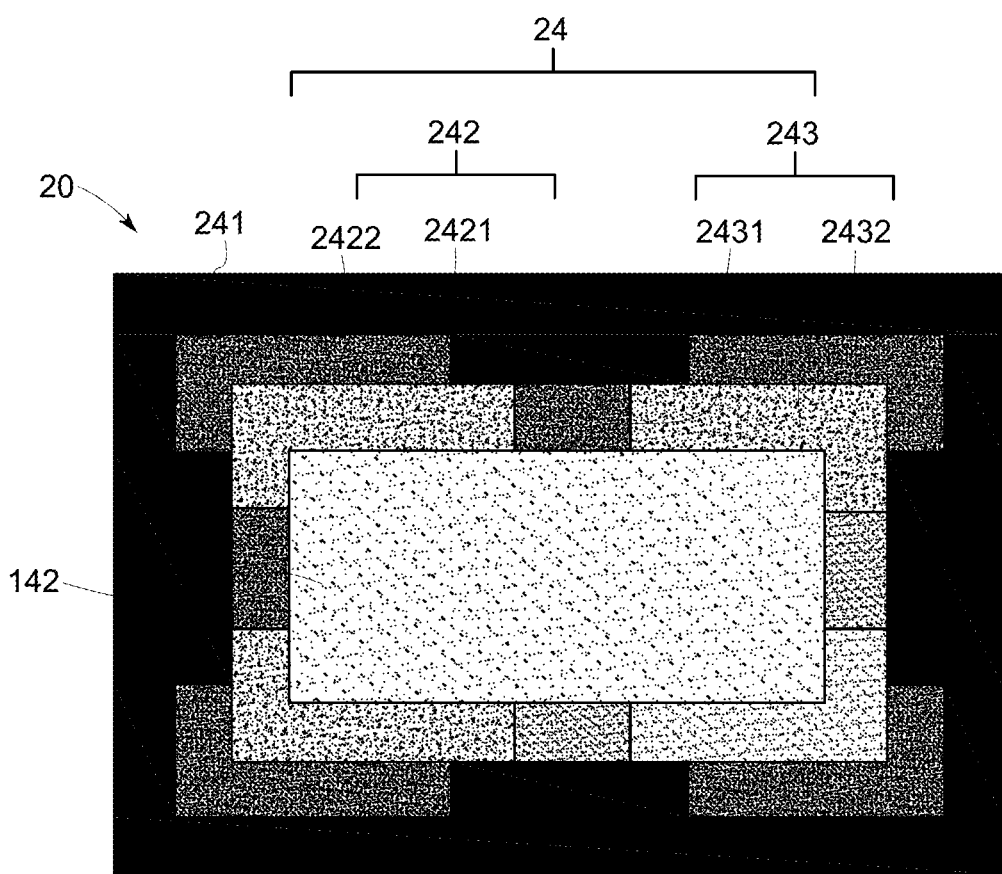
FIG. 15 is a schematic view of a shell containing powder of a target object, according to yet another embodiment.

In other embodiments, when the shell 24 is designed to include several different density level layers, each layer may also include different density level parts based on the material of the shell 24, the HIP process, and other related parameters. FIG. 15 shows an exemplary embodiment of a target object 20 manufactured by the EBM process. The shell 24 of the target object 20 of FIG. 15 includes three layers 241, 242, and 243. The density level of the first layer 241 is about 100%. The second layer 242 include two density level parts 2421 and 2422, the first part 2421 is in the middle of each side of the second layer 242. As an example, the density level of the first part 2421 is about 100%; the density level of the second part 2422 is about 90%. Namely, the density level of the first part 2421 is greater than the second part 2422. Similarly, the third layer 243 may include a first part 2431 with about 90% density level, and a second part 2432 with about 80% density level. The above parameters' arrangement is calculated in the step 74 of the method 70 as mentioned above.

Figure 16:
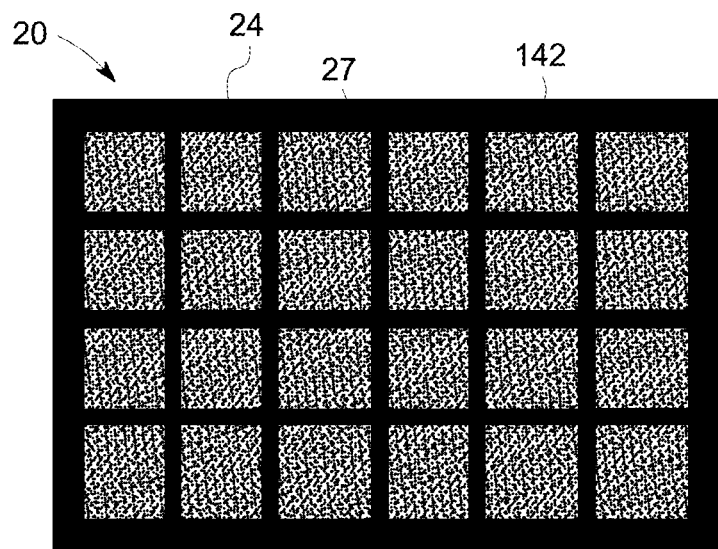
FIG. 16 is a schematic view of a shell containing powder of a target object, according to yet another embodiment.

In other embodiments, compared with the embodiment shown in FIG. 16, the shell 24 may further include some support ribs 27 extended from inside surfaces to opposite insides surfaces of the shell 24. These support ribs 27 may also be manufactured by using the electron beam 112 to melt the corresponding part of the powder 142 according to a three-dimensional model having support ribs. In other embodiments, the shell 24 containing powder 142 may be designed in different types according to related parameters, but not limited as in the embodiments disclosed above.

Figure 17:
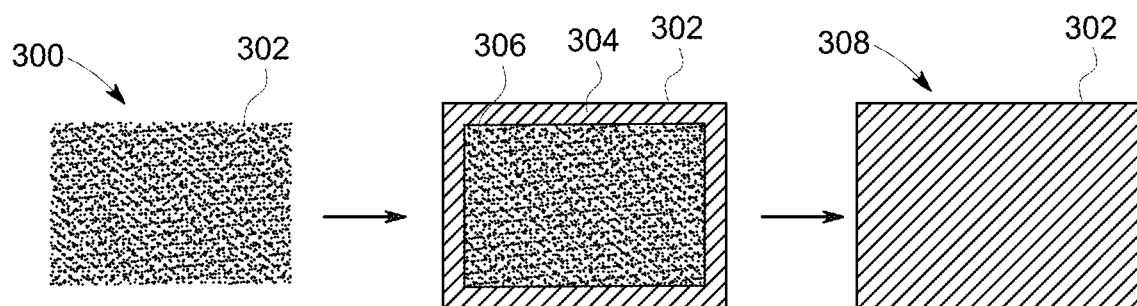
FIG. 17 shows several stages of a method for forming a target object.

With respect to FIG. 17, in another embodiment, method for manufacturing a target object includes forming a porous object 300 from a loose powder to have a first density level, which may be at least approximately 30% and may be more than approximately 50% in other embodiments. In the embodiment shown, the density level of the porous object 300 is approximately 70%. In order to form the porous, or "pre-compacted" object 300, an amount of loose powder may be directed into a constriction die (not shown) and densified to the first density level. The loose powder may be an elemental, blended elemental that may contain master alloy, or alloy powder metallurgical product. In a preferred embodiment, an outer surface region 302 of the porous object has a surface porosity having finely distributed pores. The pores may have sizes between approximately 10 micrometers and approximately 100 micrometers, which, as understood in the art, depends on the size of the powder metallurgical products and the density level of the object. In order to increase the density level of a portion of object, the porous object 300 is treated to thereby define a treated region 304 having a second density level. More specifically, an outer surface region 302 is treated to have the second density level. As described herein, "outer surface region" is meant to describe a region of the object beginning at the outer surface and traversing inward of the body of the object toward an imaginary axis thereof. Moreover, when referring to "outer surface region" herein, such a term encompasses the whole of the outer surface region 302 as disclosed above or, alternatively, only a portion thereof. Therefore, in one embodiment, the treated region 304 may encompass all or part of the outer surface region 302. Alternatively, the treated region 304 may be located at other parts of the object 300.

In at least one embodiment, once the outer surface region 302 is treated, the density level of the treated region 304, or the second density level, is at least about 95% such that the pores that existed prior to the treatment are substantially eliminated. With a density level of at least about 95% and a thickness between approximately 0.025 mm and approximately 1 mm, the treated region 304 essentially acts as a hermetic seal to the inner portion 306, which still has the first density level. The thickness of the treated region 304 is sufficient such that a seal can be formed and that sufficient strength is present to maintain the seal through further transportation, treatment, and processing, such as by HIP or PIF, or any other treatment processes or methods by which an object may be densified or consolidated. Once the porous object 300 is treated, the object 300 is densified or consolidated to form the target object 308 having at least about 95% density level and preferably about 100% density. Notably, the shrinkage of the target object 308 after the HIP or PIF process will be taken into account in a same or similar manner as described above with respect to the other embodiment. It will be appreciated that the size and shape difference that the target object 308 may possess relative to the porous object 300 after HIP or PIF treatment, but before shrinkage occurs, is not shown. It will also be appreciated that while the inner, untreated region 306 may include the first density level and the treated region 304 may include the second density level, there may not be an exact point of delineation between the first and second densities. Rather, there may be a gradual change, or density gradient, from the second density level to the first density level.

Such an approach of essentially sealing the porous object 300 prevents environmental and contaminant sources from infiltrating the porous object 300 prior to consolidation or densification of the object 300 to a target object shape and size. Moreover, the approach as disclosed herein allows for the use of lower packing density level materials. It will be appreciated that the treated region 304 is essentially an in situ can that likely does not require the use of a can described herein, as is a typical practice in the art. Finally, since no can is required, machining the target object 308 after densification to remove the excess material (caused by the interaction between the object and the can) is unnecessary, thereby saving time and reducing yield loss. Further cost savings are realized when it is considered that rather than replacing well-known processes with new processes to create densified target objects, the disclosure herein teaches an approach that is supplemental to existing powder metallurgy processes such as HIP or PIF.

In one embodiment, treating the porous object 300 includes utilizing a material fusion process. In order to effectuate treatment of the outer surface region 302, a penetration of the fusion process is limited to a certain depth such that only the outer surface region 302 is treated. Such material fusion processes may include, but are not limited to, microwave, laser melting, electron beam (EB) melting, TIG melting, infrared heating, and other weld-overlay type processes involving a rastered scan of the surface that produce overlapping fusion zones and a high quality surface layer. The local fusion layer may also be formed by processes including, but not limited to, transient liquid phase sintering and induction melting.

In another embodiment, treating the porous object 300 involves solid state processing by sintering and diffusion in the outer surface region 302. Such processes include, but are not limited to, microwave sintering, induction sintering, and controlled laser sintering. In yet another embodiment, treating the porous object 300 includes formation of a local fusion layer at the outer surface region 302.

In yet another embodiment, treating the porous object 300 includes selectively mechanically and plastically deforming the outer surface region 302. The deformation may be accomplished by processes including, but not limited to peening, burnishing, cold extrusion, warm extrusion, or other deformation processes whereby the outer surface portion 302 is deformed such that the density level thereof is at least about 95%.

In yet another embodiment, treating the porous object 300 includes coating the outer surface region 302 with a coating layer. Preferably, the coating layer is non-reactive with the materials from which the porous object 300 is made. Such a non-reactive material may include glass or aluminum. Alternatively, a material that reacts with the surface to form a stable coating layer that is capable of transferring a load at temperatures of approximately ½ of the melting temperature of the material from which the porous object is made or higher when it diffuses into or with the base material, may be used. The coating layer may coat the entire outer surface region 302 or, alternatively, only a portion thereof.

Figure 18:
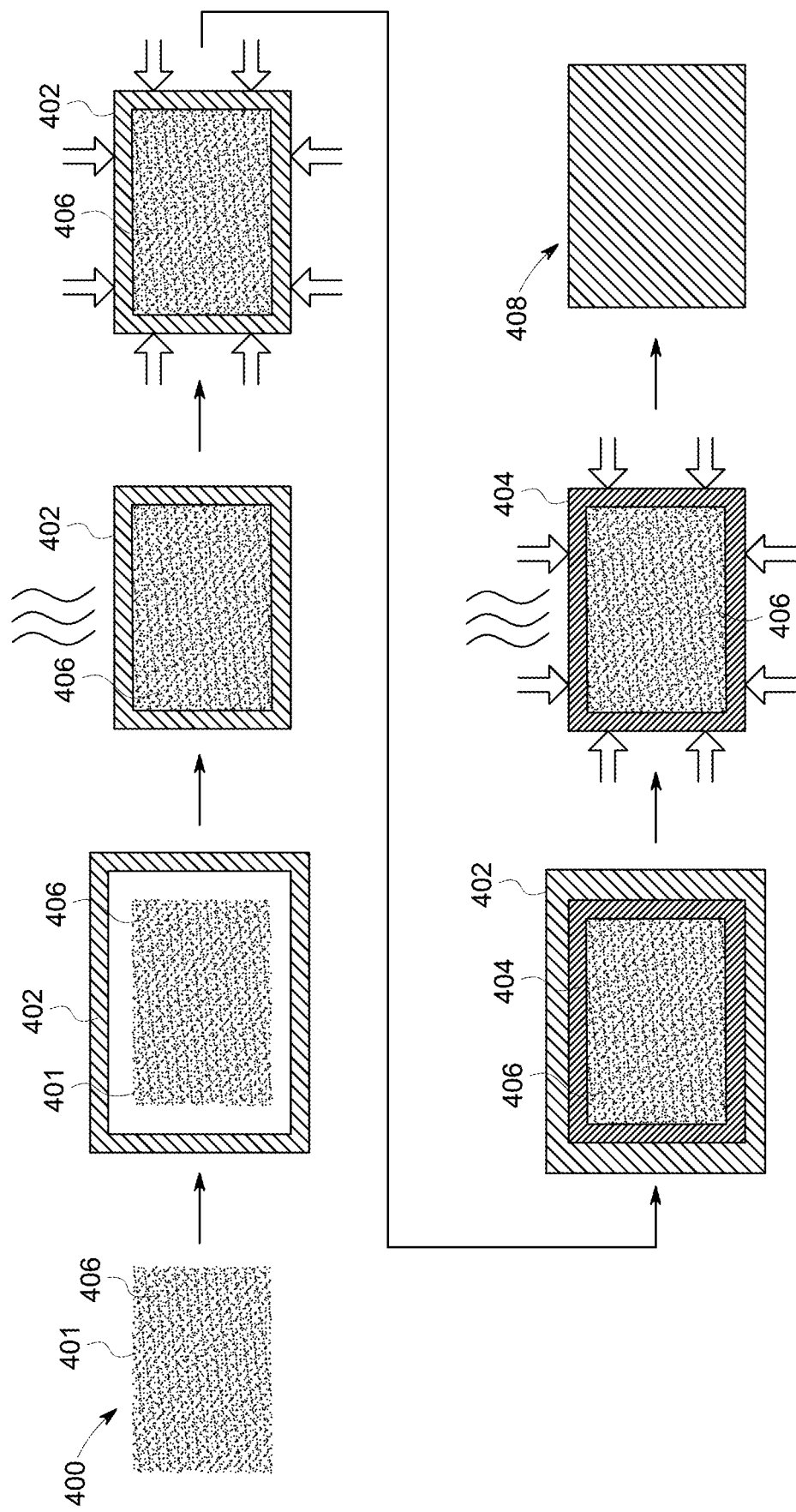
FIG. 18 shows several stages of an alternative embodiment of a method for forming a target object.

In yet another embodiment, treating the porous object 300 includes cladding-type processes. Such cladding-type processes include, but are not limited to, laser cladding, TIG overlay, braze foil cladding, cold spray, metal paint, etc. Optionally, once the cladding-type process takes place, the outer surface region 302 may be optionally thermally treated to diffuse together the powder metallurgy product with the cladding-type materials in a controlled fashion in order to form an alternative coating layer. In another embodiment, referring to FIG. 18, treating a porous object 400, and specifically, treating a surface region 401 includes encapsulating the porous object 400 in a bag 402, made out of rubber, silicone, elastomer, or other similar material. The porous object 400 and the bag 402 are evacuated whereby they are subjected to a vacuum process. The porous object 400 and the bag 402 are then heated to an elevated temperature for a period of time such that the bag 402 and the outer surface region 401 of the porous object 400 reach the elevated temperature, but the inner portion 403 of the porous object 400 is at a temperature below the elevated temperature (i.e., at room temperature). In one embodiment, the elevated temperature is between approximately 600° F. and approximately 700° F. Once the porous object 400 is heated as just described, the heated porous object 400 is subjected to a PIF process. Because the flow stress of the heated surface region 401 is lower than the flow stress of the cooler inner portion, the PIF process results in only densification of the surface region 401. Similar to other embodiments, after the outer surface region 401 is treated, a shell 404 is formed. The density of the shell 404 is at least approximately 95% such that the shell 404 provides a hermetic seal for the inner, untreated region 406, which has a density of at least approximately 30%. As before, there may be a density gradient between the treated region (shell 404) and the untreated inner region 406. Once the outer surface region 401 is treated, such that a shell 404 is formed, essentially forming an in situ can, the object 400 may be densified according to processes such as HIP, PIF, or other processes. For example, in a PIF process, the object 400 may be heated up to an elevated temperature which is a function of the melting point of the material(s) of which the object is composed. The object 400 is then removed from the source of heat and subjected to pressure between approximately 5,000 psi and 60,000 psi to densify the porous object 400 to a density of at least approximately 95%, and preferably 100% density, such that a target object 408 is formed.

In any of the embodiments described herein, HIP processing may be performed at pressures in the range of up to about 45 ksi and at temperatures above about one half of the melting temperature but below the solidus of the material being subjected to HIP. Other material-specific considerations may also further limit the range of HIP temperatures used and therefore the HIP processing is not limited to the pressures and temperatures described herein. PIF conditions may be in the range of about 10 ksi to up to about 60 ksi pressure and preheat temperatures above about one half of the melting temperature but below the solidus of the material being subjected to the PIF process. Similar material-specific considerations may also further limit the range of PIF temperatures used and therefore the pressures and preheat temperatures described herein with respect to PIF are not meant to be limiting.

The disclosure described herein may be used in combination with other processing techniques including those disclosed in U.S. Pat. Nos. 6,737,017, 7,329,381, and 7,897,103, which are incorporated herein by reference, in their entireties. The disclosure as described herein is particularly useful for the consolidation of high quality titanium alloy materials but is also applicable to other material systems including Al, Fe, Ni, Co, Mg, and other combinations of materials. The process as disclosed herein, which essentially creates a seal on the outer surface region 302 of a porous object 300, (also referred to herein as a "precompacted shape") of loose powder material (elemental, blended elemental that may contain master alloy, or alloy) that maintains its own shape on all sides without the use of a container such as a can. The precompacted shape may be any shape including a cylinder, rectangular prism, hexagonal cylinder, or other three-dimensional shape that is appropriate for downstream consolidation and use. The process can be applied to mill products (bars, billets, plate, sheets, tube, pipe, etc.) that can be further processed into components or to net or near net shape components directly. Components of interest include turbine engine parts such as disks, rings, blisks, shafts, blades, vanes, cases, tubes, and other components; automotive components including engine and body parts; industrial components; biomedical articles; sporting goods; and other applications. These embodiments of the invention, however, are not limited to specific applications.

In each of the embodiments, the shell may be selected to be either thin or thick, have an abrupt interface with the material internal to the shell or have a graded density interface, may be made from the same material as the powder being consolidated or made from a differing material, the shell may be maintained in the final industrial part or may be removed by conventional machining or other dissolution or etching processes. Furthermore, the shell may contain an integral duct which can be used to evacuate the internal cavity of the initial object and then sealed off prior to densification processing in order to enable removal of undesirable gaseous species from the internal portions of the bulk material prior to densification. Additionally densified articles produced by this method can be net shape, near net shape, or may require significant additional processing by forging, machining and/or other processing routes prior to use. Preferably the article is formed of a metallic material and more preferably of a metallic alloy material but the scope of this disclosure is not so limited.

While the technology has been described with reference to exemplary embodiments, it will be understood by those skilled in the art that various changes may be made and equivalents may be substituted for elements thereof without departing from the scope of the claimed inventions. In addition, many modifications may be made to adapt a particular situation or material to the teachings of the disclosure without departing from the scope of the claimed invention. Therefore, it is intended that the claimed inventions not be limited to the particular embodiments disclosed, but that the claimed inventions include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

What is claimed is:

1. A method of manufacturing a three-dimensional target object, the method comprising:
    forming a shell from loose machining powder using an additive manufacturing process, wherein the shell defines an enclosure that contains additional machining powder;
    subjecting the shell to a densification process to form a target object, wherein the densification process comprises causing metallurgical bonding between the shell and additional machining powder contained in the enclosure defined by the shell and shrinking and/or distorting the shape of the shell to conform the target object to a three-dimensional model for the target object;
    wherein the shell comprises a plurality of layers and/or parts that differ at least in respect of density, wherein the plurality of layers and/or parts are configured based at least in part on the shrinking and/or distorting the shape of the shell needed to conform the target object to the three-dimensional model for the target object.

2. The method of claim 1, comprising:
forming the shell using electron beam melting, selective laser melting, or direct metal laser melting.

3. The method of claim 2, comprising:
performing the electron beam melting, the selective laser melting, or the direct metal laser melting under a vacuum condition or a non-vacuum condition.

4. The method of claim 1, wherein the additional machining powder contained in the enclosure defined by the shell comprises loose machining powder and/or sintered machining powder and/or a sintered supporting pattern.

5. The method of claim 1, wherein the shell comprises a vacuum sealed three-dimensional shell having a predetermined internal porosity.

6. The method of claim 1, wherein the densification process comprises hot isostatic pressing or pneumatic isostatic forging.

7. The method of claim 1, wherein forming the shell comprise:
pumping air and/or inert gas from the shell through a duct defining a portion of the shell; and
sealing the shell to maintain a vacuum level in the enclosure defined by the shell.

8. The method of claim 1, wherein forming the shell comprise:
melting and/or sintering at least a portion of the additional machining powder contained in the enclosure defined by the shell.

9. The method of claim 1, comprising:
forming the shell based at least in part on a compensated-three-dimensional model for the target object, the compensated-three-dimensional model configured such that the shrinking and/or distorting the shape of the shell resulting from the densification process causes the target object to conform to the three-dimensional model for the target object.

10. The method of claim 9, wherein:
the quantity of the plurality of layers and/or parts of the shell, the density level of respective layers and/or parts of the plurality of layers and/or parts of the shell, and/or the thickness of the plurality of layers and/or parts of the shell, are respectively determined based on the compensated-three-dimensional model.

11. The method of claim 1, wherein the plurality of layers and/or parts of the shell comprises:
a first density level layer comprising a first density, and a second density level layer comprising a second density, wherein the first density is greater than the second density; and/or
a third density level part having a third density, and a fourth density level part having a fourth density, wherein the third density is greater than the fourth density.

12. The method of claim 1, wherein forming the shell comprises:
forming a porous object; and
treating at least a portion of the porous object to provide a treated region defining a hermetic seal to an inner portion of the porous object.

13. The method of claim 12, wherein treating the at least a portion of the porous object comprises performing an electron beam melting process or a laser sintering process.

14. The method of claim 12, wherein treating the at least a portion of the porous object comprises performing a peening process, a burnishing process, a cold extrusion process, or a warm extrusion process.

15. The method of claim 12, wherein treating the at least a portion of the porous object comprises applying a coating layer to the at least a portion of the porous object.

16. The method of claim 12, wherein the porous object has a pore size distribution of from 10 to 100 micrometers prior to treating the at least a portion of the porous object.

17. The method of claim 12, wherein at least a portion of the treated region has a density level of at least 95%; and/or
wherein at least a portion of the target object has a density level of at least 95%.

18. The method of claim 12, wherein the treated region comprises an outer surface region that has a thickness of from 0.025 millimeters to 1 millimeter.

19. The method of claim 1, wherein the densification process comprises using a selectively mechanically and plastically deforming machining technology.

20. The method of claim 19, wherein the selectively mechanically and plastically deforming machining technology comprises a peening process, a burnishing process, a cold extrusion process, or a warm extrusion process.

* * * * *